United States Patent
Terry et al.

(10) Patent No.: US 7,127,256 B2
(45) Date of Patent: Oct. 24, 2006

(54) DYNAMIC CHANNEL QUALITY MEASUREMENT PROCEDURE IMPLEMENTED BY USER EQUIPMENT FOR ADAPTIVE MODULATION AND CODING TECHNIQUES

(75) Inventors: Stephen E. Terry, Northport, NY (US);
Stephen G. Dick, Nesconset, NY (US);
James M. Miller, Verona, NJ (US);
Eldad Zeira, Huntington, NY (US);
Ariela Zeira, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 146 days.

(21) Appl. No.: 10/768,223

(22) Filed: Jan. 30, 2004

(65) Prior Publication Data

US 2004/0185789 A1    Sep. 23, 2004

Related U.S. Application Data

(63) Continuation of application No. 10/029,569, filed on Dec. 21, 2001, now Pat. No. 6,810,236.

(60) Provisional application No. 60/290,877, filed on May 14, 2001.

(51) Int. Cl.
*H04Q 7/20* (2006.01)
(52) U.S. Cl. .................. 455/452.2; 455/62; 455/67.11; 455/509; 455/512; 455/450; 455/452.1; 455/456.2; 455/456.5; 455/524; 455/525; 370/332; 370/329; 370/348
(58) Field of Classification Search .............. 455/67.11, 455/452.2, 450, 456.5, 509, 524, 452.1, 512, 455/456.2, 62
See application file for complete search history.

(56) References Cited

U.S. PATENT DOCUMENTS 5,375,123 A    12/1994    Andersson et al.

(Continued)

FOREIGN PATENT DOCUMENTS

| EP | 1 024 622 A2 | 8/2000 |
|---|---|---|
| EP | 1024622 | 8/2000 |
| WO | 00/72496 A1 | 11/2000 |

(Continued)

OTHER PUBLICATIONS

WO 00/72496, Hanzo Lajos; Kuan EE Lin; Cherriman Peter John; Univ Sou, Nov. 30, 2000.

*Primary Examiner*—Marceau Milord
(74) *Attorney, Agent, or Firm*—Volpe and Koenig, P.C.

(57) ABSTRACT

A wireless digital communication method for a plurality of user equipment mobile terminals (UEs) to communicate with a base station. Adaptive modulation and coding (AM&C) is used to achieve improved radio resource utilization and provide optimum data rates for user services. Blocks of downlink (DL) data are received by the base station which requests downlink DL channel quality measurements only from those mobile terminals (UEs) with pending downlink transmissions. The UEs respond to the request by measuring and reporting DL channel quality to the base station, which then allocates resources such that the UEs will make best use of radio resources. The base station notifies the UEs of the physical channel allocation indicating the modulation/coding rate and allocated slots followed by transmission of blocks of downlink data which are transmitted to the UEs.

45 Claims, 2 Drawing Sheets

U.S. PATENT DOCUMENTS

| | | | |
|---|---|---|---|
| 5,428,816 A | 6/1995 | Barnett et al. | |
| 5,701,294 A | 12/1997 | Ward et al. | |
| 5,867,478 A | 2/1999 | Baum et al. | |
| 5,940,439 A * | 8/1999 | Kleider et al. | 375/225 |
| 5,949,790 A | 9/1999 | Pehkonen et al. | |
| 5,960,335 A | 9/1999 | Umemoto et al. | |
| 6,101,179 A | 8/2000 | Soliman | |
| 6,115,406 A | 9/2000 | Mesecher | |
| 6,167,031 A * | 12/2000 | Olofsson et al. | 370/252 |
| 6,208,663 B1 * | 3/2001 | Schramm et al. | 370/465 |
| 6,298,035 B1 | 10/2001 | Heiskala | |
| 6,301,265 B1 * | 10/2001 | Kleider et al. | 370/465 |
| 6,307,867 B1 * | 10/2001 | Roobol et al. | 370/470 |
| 6,330,288 B1 * | 12/2001 | Budka et al. | 375/296 |
| 6,347,071 B1 | 2/2002 | Cupo et al. | |
| 6,373,877 B1 | 4/2002 | Mesecher | |
| 6,374,118 B1 | 4/2002 | Toskala et al. | |
| 6,381,231 B1 | 4/2002 | Silventoinen et al. | |
| 6,381,445 B1 | 4/2002 | Ue et al. | |
| 6,414,946 B1 | 7/2002 | Satou et al. | |
| 6,545,997 B1 | 4/2003 | Bohnke et al. | |
| 6,567,665 B1 | 5/2003 | Kissee | |
| 6,584,092 B1 | 6/2003 | Sudo | |
| 6,603,797 B1 | 8/2003 | Zeira et al. | |
| 6,631,123 B1 | 10/2003 | Jiang et al. | |
| 6,700,881 B1 * | 3/2004 | Kong et al. | 370/335 |
| 6,707,808 B1 | 3/2004 | Vedrine | |
| 6,721,569 B1 | 4/2004 | Hashem et al. | |
| 6,791,960 B1 | 9/2004 | Song | |
| 6,810,236 B1 * | 10/2004 | Terry et al. | 455/67.11 |
| 6,850,540 B1 | 2/2005 | Peisa et al. | |
| 6,909,901 B1 * | 6/2005 | Terry et al. | 455/452.2 |
| 6,928,065 B1 * | 8/2005 | Logalbo et al. | 370/337 |
| 6,958,989 B1 | 10/2005 | Dick et al. | |
| 6,963,540 B1 | 11/2005 | Choi et al. | |
| 6,987,746 B1 | 1/2006 | Song | |
| 7,035,234 B1 | 4/2006 | Toskala et al. | |

* cited by examiner

DYNAMIC CHANNEL QUALITY MEASUREMENT PROCEDURE IMPLEMENTED BY USER EQUIPMENT FOR ADAPTIVE MODULATION AND CODING TECHNIQUES

CROSS REFERENCE TO RELATED APPLICATIONS

This application is a continuation of U.S. patent application Ser. No. 10/029,569, filed Dec. 21, 2001, now U.S. Pat. No. 6,810,236, which claims priority from U.S. Provisional Patent Application No. 60/290,877, filed May 14, 2001, which applications are incorporated herein by reference.

BACKGROUND

The present invention relates to wireless digital communication systems. More particularly, the present invention relates to communication stations which employ code-division multiple access (CDMA) technology. Specifically, the present invention relates to determining radio conditions for use in optimizing radio resource utilization as well as selecting data rates for user services.

In code-division multiple access (CDMA) third generation (3G) cellular telecommunication systems, adaptive modulation and coding (AM&C) techniques are applied to transmissions in order to achieve improved radio resource utilization and provide increased data rates for user services under appropriate conditions. These AM&C techniques take into account radio conditions in advance of transmissions in order to determine modulation and coding rates that take the greatest advantage of current radio propagation conditions utilizing these techniques.

Utilizing these AM&C techniques, a procedure is required that provides a physical channel quality measurement from the receiver in advance of each transmission. Based on this quality measurement, the transmitter determines the appropriate modulation and coding rate for the particular transmission.

In CDMA systems, as with any wireless systems, radio conditions can change rapidly due to a wide variety of both natural and man-made conditions. Since the channel quality measurement is used to determine transmission modulation and coding, and since channel quality changes rapidly due to the changing conditions of the transmission path, the performance of the adaptive transmission process is directly related to the length of the time period between when the channel quality measurement is performed and when the transmission is initiated.

Physical or logical control channels are then used to transfer the channel quality measurements from the receiver to the transmitter. Channel quality signaling may utilize either dedicated control channels to each user equipment (UE) or common control channels shared by all UEs. A UE may be a cellular phone, PDA (personal data assistant) or any other type of wireless device. When dedicated control channels are used, a continuous signaling channel is available over time for propagation of channel quality measurements for each UE. This is an optimal solution for AM&C since the quality measurement is continuously available. Transmissions can occur at any time, taking into account the continuously available quality measurement for appropriate modulation and coding settings. Additionally, with a dedicated control channel always available in the uplink, the channel can be also used to support low rate uplink data transmissions.

The difficulty with the dedicated control channel approach is that physical resources are continuously allocated even when there is no data to transmit. A primary application of AM&C techniques is non-real time high data rate services, for example, Internet access. For these classes of service, the best quality of service (QoS) is achieved with short, high rate transmissions with relatively long idle periods between each transmission. These long idle periods result in an inefficient use of dedicated resources.

The problem can be minimized with pre-configured periodic dedicated channel allocations. But this results in periodic availability of quality measurements. If the quality measurements are not continuously available, for UEs which have transmissions at any one point in time, only some portion of the UEs will have recent channel quality measurements.

Another alternative is the use of common control channels. With common control channels, a continuous signaling channel exists that is shared between all UEs within the cell. Procedures are defined for determining each UEs access to the common control channel. UE identities are used to distinguish UE specific transactions.

The difficulty with the common control approach for support of AM&C is the large amount of signaling overhead necessary to administrate each UE's access to the control channel. As aforementioned, UE identities are required to distinguish UE specific transactions. Additionally, to avoid contention-based access to the uplink common control channel, individual allocations are required to be signaled on the downlink common control channel for each UE's access. Since uplink transmissions cannot always be predicted, periodic allocations of the uplink control channel must be signaled on the downlink common control channel, which results in considerable signaling overhead. Also, the common control approach does not provide for low rate, uplink data transmissions.

In summary, the efficient performance of AM&C techniques is primarily based on the availability of recent physical channel quality measurements from the receiver in advance of each transmission. Optimally, measurements are available with minimal latency for all users with active data transmissions. The dedicated control channel solution provides continuous measurements, but since transmissions are discontinuous, this is an inefficient use of radio resources. Periodic configured dedicated control channels minimize the radio resource requirement, but this increases measurement latency. The common control channel method can provide measurements on a continuous or periodic basis, but the signaling overhead results in an inefficient use of radio resources.

There exists a need for a system that provides channel quality measurements with low latency and low signaling overhead.

BRIEF DESCRIPTION OF THE DRAWING(S)

The objectives of the present invention will become apparent upon consideration of the accompanying detailed description and figures, in which.

DETAILED DESCRIPTION OF THE PREFERRED EMBODIMENT(S)

Figure 1:
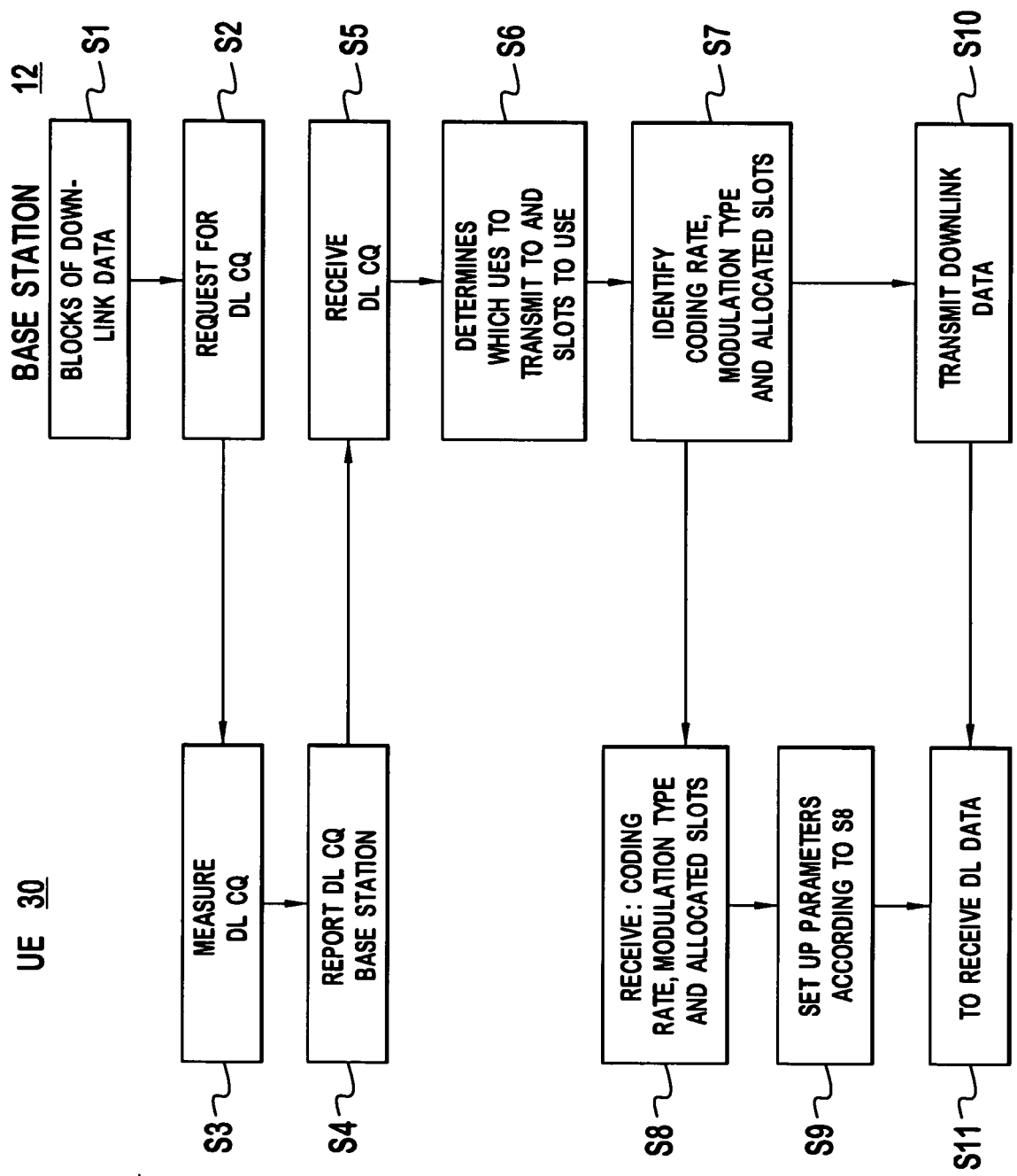
FIG. 1 is a flow chart illustrating one preferred Dynamic Channel Quality Measurement Procedure (DCQMP) of the present invention.

Presently preferred embodiments are described below with reference to the drawing figures wherein like numerals represent like elements throughout.

FIG. 1 is a flow diagram which illustrates the dynamic channel quality (CQ) measurement procedure 60 of the present invention which may be implemented by a wireless digital communication system having a base station/node B (hereinafter base station 12) which communicates with at least one UE 30. Although it is intended for the presently inventive method to support communications between a base station and a plurality of UEs, for simplicity the following description will detail the steps performed by a single UE, it being understood that other UEs will operate in a similar manner.

Blocks of downlink (DL) data are transferred to the base station 12 which are designated for a particular UE 30 (step S1).

The base station 12, responsive to receipt of downlink data and in advance of a transmission to the UE 30, requests DL CQ measurements only from a UE 30 having pending downlink transmissions (step S2).

The UE 30 receives the request and makes the requested CQ measurement at step S3 and reports the DL CQ measurement to the base station 12 at step S4.

Based on the CQ measurement reports received from each UE (step S5), the base station 12 determines which of the UEs will make the best use of radio resources, and determines which slots to use (step S6). Preferably, the UEs are prioritized by their CQ so that the UE with the highest CQ is sent its data first and then the UE with the second highest CQ is sent its data second, and so on until the UE with the lowest CQ is sent its data last.

Since the CQ measurement requests and the responsive CQ measurement reports are only generated when needed, the signaling overhead required for a common control channel is greatly reduced. Measurement reports are available for all active transmitting users, similar to the dedicated control channel case, but avoiding the resource inefficiency during idle periods.

The priority of transmissions is determined according to the DL CQ measurements, and the DL physical channel allocation is signaled to the appropriate UEs, indicating the particular coding rate, modulation type and allocated slots (step S7). The designated UE receives the coding rate, modulation type and allocated slots (step S8), and sets these parameters for reception (step S9).

Blocks of downlink data are then transmitted by the base station 12 to the designated UE 30 (step S10) a given, but short, time after performance of step S7 to enable the LIE 30 time to set up for reception. The LIE 30 receives the downlink data (step S11) at the specified coding rate, modulation type and in the allocated slots specified at step S7.

The present invention thus provides the fundamental requirements for AM&C operation while maintaining the most efficient use of radio resources. Since DL CQ measurements are available with the minimum possible latency for all transmissions, the choice of the best user(s) to provide service in the next transmission time frame is optimized. Additionally, measurements provided by periodic or continuous mechanisms do not provide increased benefit, performance gain or enhancement over the present invention.

Implementation of the present invention also minimizes measurement processing and the associated power consumption, especially important in the UE, which is typically powered by a small power source of limited capacity, (i.e. a chargeable battery). Since a quality measurement is only requested for a particular active transmission, the number of required measurements are minimized.

Figure 2:
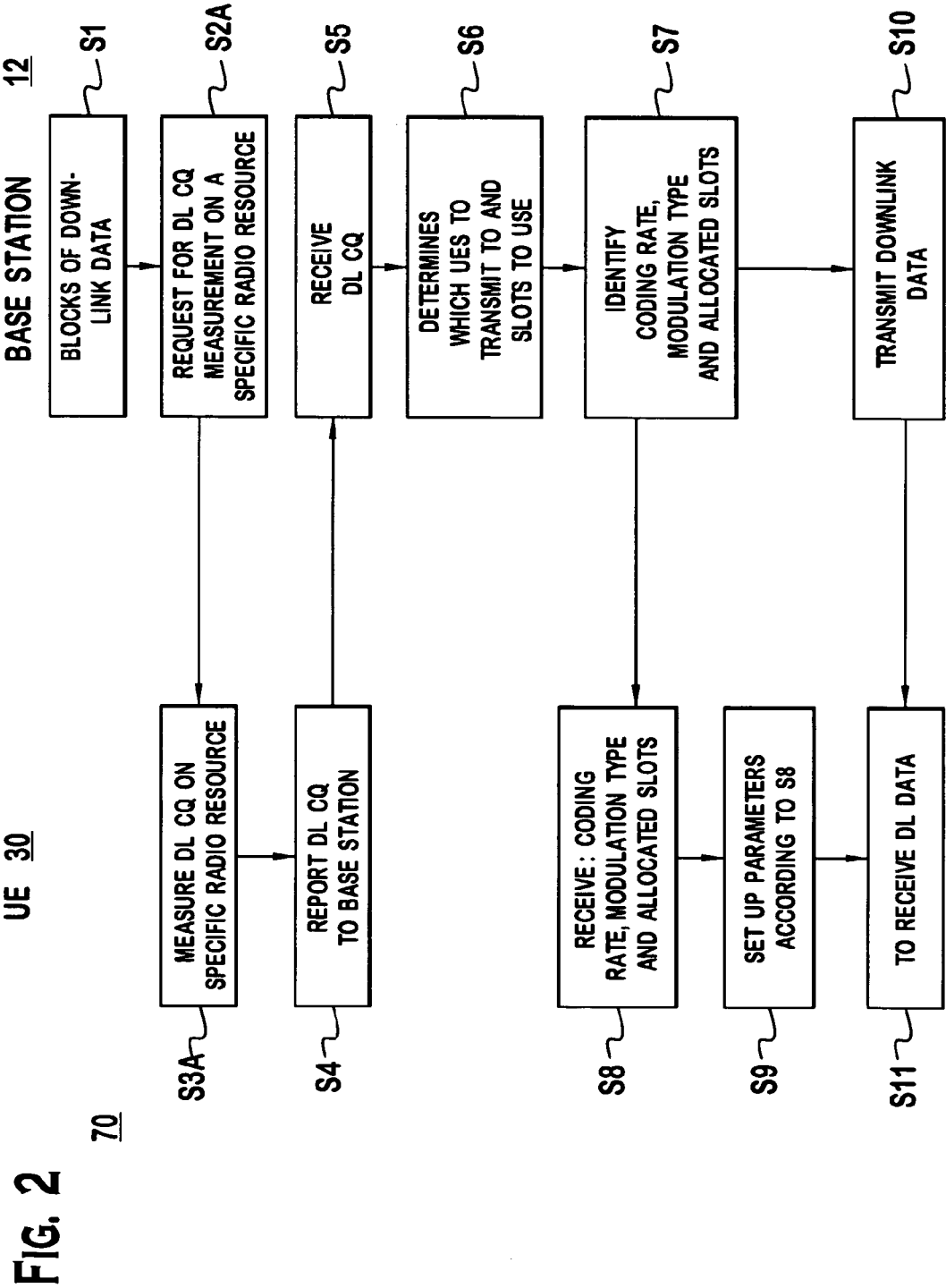
FIG. 2 shows an alternative embodiment of the DCQMP of the present invention shown in FIG. 1.

In accordance with an alternative embodiment of the method 70 of the present invention shown in FIG. 2, only certain quality measurements may be required depending on the radio resources used for a particular transmission. For example, in the 3G standards, the CQ for only specific physical timeslots may be requested. Therefore, the number of measurements performed is reduced by limiting the requirement of a CQ measurement to only active transmissions and, depending on the scale of the transmission, only requiring measurement on particular radio resources, (i.e., specific time slots). This is shown in FIG. 2, which is similar to FIG. 1 except for modified steps S2A and S3A, which replace steps S2 and S3 respectively of FIG. 1. In step S2A, the base station 12 requests the UE 30 to perform a measurement only on a particular radio resource. In response, the UE performs the DL CQ measurement on the specified radio resource (step S3A).

The present invention provides many advantages over prior art schemes. First, the invention provides the highest efficiency utilization of the air interface since only those UEs having pending transmissions will be required to respond to a request for DL CQ measurements. This permits the overhead signaling to be at a minimum.

Second, since the transmissions are prioritized according to the highest quality DL CQ measurements, the highest data rates permissible will be achieved for each time slot or multiple time slots.

Third, since UEs are only required to respond to the request for the DL CQ measurements, unnecessary measurements by the UEs will not be required, thereby saving the battery life of the UEs.

A final advantage of the present invention is the increased number of users that may be supported in a cell for both of the methods disclosed herein. The number of users that are supported is limited in the dedicated control channel method by the requirement for dedicated radio resources; and in the common control channel method by signaling overhead requirements. By limiting the measurement signaling procedures to active users, the present invention minimizes the common control signaling overhead and supports the greatest number of users in the cell.

While the present invention has been described in terms of the preferred embodiment, other variations which are within the scope of the invention as outlined in the claims below will be apparent to those skilled in the art.

What is claimed is:

1. In a wireless communication system including a plurality of user equipment mobile terminals (UEs) and a base station, wherein a first subset of the UEs have pending downlink transmissions and a second subset of the UEs do not have pending downlink transmissions, a method of minimizing overhead signaling and optimizing radio resource utilization by restricting the transmission of channel quality measurement requests to only those UEs that have pending downlink transmissions so as to avoid unnecessary channel quality measurements performed by the UEs and also avoid unnecessary channel quality measurement requests transmitted by the base station, the method comprising:

(a) each of the UEs in the first subset receiving from the base station a request to begin channel quality measurements, whereby the base station does not transmit a request to begin channel quality measurements to the UEs in the second subset due to not having pending downlink transmissions;

(b) each of the UEs in the first subset performing channel quality measurements and transmitting to the base station the results of the channel quality measurements, whereby the UEs in the second subset do not perform channel quality measurements because they did not receive a request to begin channel quality measurements from the base station due to not having pending downlink transmissions; and (c) the base station allocating radio resources used by the UEs in the first subset in response to the results of the channel quality measurements transmitted to the base station by the UEs in the first subset.

2. The method of claim 1 further comprising:

(d) each of the UEs in the first subset receiving a communication signal from the base station that indicates a particular coding rate, modulation type and at least one allocated time slot.

3. The method of claim 2 wherein each of the UEs in the first subset prepare for reception of downlink data from the base station by setting reception parameters in accordance with the particular coding rate, the modulation type and the at least one allocated time slot indicated by the communication signal.

4. The method of claim 1 wherein the base station determines which of the UEs in the first subset will make the best use of radio resources.

5. The method of claim 4 wherein the base station further determines specific time slots that the UEs in the first subset should use to receive downlink data from the base station.

6. The method of claim 1 wherein the request to begin channel quality measurements is sent by the base station to the UEs in the first subset in response to the base station receiving blocks of downlink data.

7. The method of claim 1 wherein the UEs that have pending downlink transmissions perform channel quality measurements until there are no longer pending downlink transmissions.

8. In a wireless communication system including a plurality of user equipment mobile terminals (UEs) and a base station, wherein a first subset of the UEs have pending downlink transmissions and a second subset of the UEs do not have pending downlink transmissions, a method of minimizing overhead signaling and optimizing radio resource utilization by restricting the transmission of channel quality measurement requests to only those UEs that have pending downlink transmissions so as to avoid unnecessary channel quality measurements performed by the UEs and also avoid unnecessary channel quality measurement requests transmitted by the base station, the method comprising:

(a) each of the UEs in the first subset receiving from the base station a request to begin channel quality measurements, whereby the base station does not transmit a request to begin channel quality measurements to the UEs in the second subset due to not having pending downlink transmissions;

(b) each of the UEs in the first subset performing channel quality measurements and transmitting to the base station the results of the channel quality measurements, whereby the UEs in the second subset do not perform channel quality measurements because they did not receive a request to begin channel quality measurements from the base station due to not having pending downlink transmissions;

(c) the base station determining which of the UEs in the first subset will make the best use of radio resources; and (d) the base station sending downlink data only to the UEs determined in step (c).

9. The method of claim 8 further comprising:

(e) each of the UEs determined in step (c) receiving a communication signal from the base station that indicates a particular coding rate, modulation type and at least one allocated time slot.

10. The method of claim 9 wherein each of the UEs determined in step (c) prepare for reception of downlink data from the base station by setting reception parameters in accordance with the particular coding rate, the modulation type and the at least one allocated time slot indicated by the communication signal.

11. The method of claim 10 wherein the base station further determines specific time slots that the UEs determined in step (c) should use to receive downlink data from the base station.

12. The method of claim 8 wherein the request to begin channel quality measurements is sent by the base station to the UEs in the first subset in response to the base station receiving blocks of downlink data.

13. The method of claim 8 wherein the UEs that have pending downlink transmissions perform channel quality measurements until there are no longer pending downlink transmissions.

14. A wireless communication system for minimizing overhead signaling and optimizing radio resource utilization, the system comprising:

(a) a base station; and (b) a plurality of user equipment mobile terminals (UEs), wherein the base station sends a request to begin channel quality measurements only to a first subset of the UEs that have pending downlink transmissions and not to a second subset of the UEs that do not have pending downlink transmissions, the UEs in the first subset perform channel quality measurements and transmit to the base station the results of the channel quality measurements, and the base station allocates radio resources used by the UEs in the first subset in response to the results of the channel quality measurements transmitted to the base station by the UEs in the first subset.

15. The system of claim 14 wherein each of the UEs in the first subset receives a communication signal from the base station that indicates a particular coding rate, modulation type and at least one allocated time slot.

16. The system of claim 15 wherein each of the UEs in the first subset prepares for reception of downlink data from the base station by setting reception parameters in accordance with the particular coding rate, the modulation type and the at least one allocated time slot indicated by the communication signal.

17. The system of claim 14 wherein the base station determines which of the UEs in the first subset will make the best use of radio resources.

18. The system of claim 14 wherein the base station further determines specific time slots that the UEs in the first subset should use to receive downlink data from the base station.

19. The system of claim 14 wherein the request to begin channel quality measurements is sent by the base station to the UEs in the first subset in response to the base station receiving blocks of downlink data.

20. The system of claim 14 wherein the UEs that have pending downlink transmissions perform channel quality measurements until there are no longer pending downlink transmissions.

21. A wireless communication system for minimizing overhead signaling and optimizing radio resource utilization, the system comprising:
(a) a base station; and
(b) a plurality of user equipment mobile terminals (UEs), wherein the base station sends a request to begin channel quality measurements only to a first subset of the UEs that have pending downlink transmissions and not to a second subset of the UEs that do not have pending downlink transmissions, the UEs in the first subset perform channel quality measurements and transmit to the base station the results of the channel quality measurements, and the base station sends downlink data to those UEs in the first subset that the base station determines will make the best use of radio resources.

22. The system of claim 21 wherein each of the UEs that the base station determines will make the best use of radio resources receives a communication signal from the base station that indicates a particular coding rate, modulation type and at least one allocated time slot.

23. The system of claim 22 wherein each of the UEs that the base station determines will make the best use of radio resources prepares for reception of downlink data from the base station by setting reception parameters in accordance with the particular coding rate, the modulation type and the at least one allocated time slot indicated by the communication signal.

24. The system of claim 21 wherein the base station further determines specific time slots that the UEs that the base station determines will make the best use of radio resources should use to receive downlink data from the base station.

25. The system of claim 21 wherein the request to begin channel quality measurements is sent by the base station to the UEs that the base station determines will make the best use of radio resources in response to the base station receiving blocks of downlink data.

26. The system of claim 21 wherein the UEs that have pending downlink transmissions perform channel quality measurements until there are no longer pending downlink transmissions.

27. In a wireless communication system including a plurality of user equipment mobile terminals (UEs) and a base station, wherein a subset of the UEs have pending downlink transmissions, a method of minimizing overhead signaling and optimizing radio resource utilization, the method comprising:
(a) each of the UEs in the subset receiving from the base station a request to begin channel quality measurements;
(b) each of the UEs in the subset transmitting to the base station the results of the channel quality measurements;
(c) the base station allocating radio resources used by the UEs in the subset in response to the results of the channel quality measurements; and
(d) each of the UEs in the subset receiving a communication signal from the base station that indicates a particular coding rate, modulation type and at least one allocated time slot, wherein each of the UEs in the subset prepare for reception of downlink data from the base station by setting reception parameters in accordance with the particular coding rate, the modulation type and the at least one allocated time slot indicated by the communication signal.

28. The method of claim 27 wherein the base station determines which of the UEs in the subset will make the best use of radio resources.

29. The method of claim 28 wherein the base station further determines specific time slots that the UEs in the subset should use to receive downlink data from the base station.

30. The method of claim 27 wherein the request to begin channel quality measurements is sent by the base station to the UEs in the subset in response to the base station receiving blocks of downlink data.

31. The method of claim 27 wherein the UEs that have pending downlink transmissions perform channel quality measurements until there are no longer pending downlink transmissions.

32. In a wireless communication system including a plurality of user equipment mobile terminals (UEs) and a base station, wherein a subset of the UEs have pending downlink transmissions, a method of minimizing overhead signaling and optimizing radio resource utilization, the method comprising:
(a) each of the UEs in the subset receiving from the base station a request to begin channel quality measurements;
(b) each of the UEs in the subset transmitting to the base station the results of the channel quality measurements;
(c) the base station determining which of the UEs in the subset will make the best use of radio resources;
(d) the base station sending downlink data only to the UEs determined in step (c); and
(e) each of the UEs determined in step (c) receiving a communication signal from the base station that indicates a particular coding rate, modulation type and at least one allocated time slot, wherein each of the UEs determined in step (c) prepare for reception of downlink data from the base station by setting reception parameters in accordance with the particular coding rate, the modulation type and the at least one allocated time slot indicated by the communication signal.

33. The method of claim 32 wherein the base station further determines specific time slots that the UEs determined in step (c) should use to receive downlink data from the base station.

34. The method of claim 32 wherein the request to begin channel quality measurements is sent by the base station to the UEs in the subset in response to the base station receiving blocks of downlink data.

35. The method of claim 32 wherein the UEs that have pending downlink transmissions perform channel quality measurements until there are no longer pending downlink transmissions.

36. A wireless communication system for minimizing overhead signaling and optimizing radio resource utilization, the system comprising:
(a) a base station; and
(b) a plurality of user equipment mobile terminals (UEs), wherein the base station sends a request to begin channel quality measurements only to a subset of the UEs that have pending downlink transmissions, the UEs in the subset transmit to the base station the results of the channel quality measurements, the base station allocates radio resources used by the UEs in the subset in response to the results of the channel quality measurements, and each of the UEs in the subset receives a communication signal from the base station that indicates a particular coding rate, modulation type and at least one allocated time slot, wherein each of the UEs in the subset prepares for reception of downlink data from the base station by setting reception parameters in accordance with the particular coding rate, the modulation type and the at least one allocated time slot indicated by the communication signal.

37. The system of claim 36 wherein the base station determines which of the UEs in the subset will make the best use of radio resources.

38. The system of claim 36 wherein the base station further determines specific time slots that the UEs in the subset should use to receive downlink data from the base station.

39. The system of claim 36 wherein the request to begin channel quality measurements is sent by the base station to the UEs in the subset in response to the base station receiving blocks of downlink data.

40. The system of claim 36 wherein the UEs that have pending downlink transmissions perform channel quality measurements until there are no longer pending downlink transmissions.

41. A wireless communication system for minimizing overhead signaling and optimizing radio resource utilization, the system comprising:
 (a) a base station; and
 (b) a plurality of user equipment mobile terminals (UEs), wherein the base station sends a request to begin channel quality measurements only to a subset of the UEs that have pending downlink transmissions, the UEs in the subset transmit to the base station the results of the channel quality measurements, the base station sends downlink data to those UEs in the subset that the base station determines will make the best use of radio resources, and each of the UEs that the base station determines will make the best use of radio resources receives a communication signal from the base station that indicates a particular coding rate, modulation type and at least one allocated time slot.

42. The system of claim 41 wherein each of the UEs that the base station determines will make the best use of radio resources prepares for reception of downlink data from the base station by setting reception parameters in accordance with the particular coding rate, the modulation type and the at least one allocated time slot indicated by the communication signal.

43. The system of claim 41 wherein the base station further determines specific time slots that the UEs that the base station determines will make the best use of radio resources should use to receive downlink data from the base station.

44. The system of claim 41 wherein the request to begin channel quality measurements is sent by the base station to the UEs that the base station determines will make the best use of radio resources in response to the base station receiving blocks of downlink data.

45. The system of claim 41 wherein the UEs that have pending downlink transmissions perform channel quality measurements until there are no longer pending downlink transmissions.

* * * * *

UNITED STATES PATENT AND TRADEMARK OFFICE
CERTIFICATE OF CORRECTION

| | | |
|---|---|---|
| PATENT NO. | : 7,127,256 B2 | Page 1 of 1 |
| APPLICATION NO. | : 10/768223 | |
| DATED | : October 24, 2006 | |
| INVENTOR(S) | : Terry et al. | |

It is certified that error appears in the above-identified patent and that said Letters Patent is hereby corrected as shown below:

IN THE SPECIFICATION

At column 3, line 52, after the words "enable the", delete "LIE" and insert therefor --UE--.

At column 3, line 53, before the words "30 receives", delete "LIE" and insert therefor --UE--.

Signed and Sealed this

Seventeenth Day of April, 2007

JON W. DUDAS
*Director of the United States Patent and Trademark Office*